United States Patent
Sinton et al.

(10) Patent No.: US 9,509,250 B2
(45) Date of Patent: Nov. 29, 2016

(54) RAPID MEASUREMENT OF CURRENT-VOLTAGE CHARACTERISTICS OF SOLAR CELLS AND MODULES

(71) Applicant: Sinton Consulting, Inc., Boulder, CO (US)

(72) Inventors: Ronald A. Sinton, Boulder, CO (US); Michael K. Forsyth, Golden, CO (US)

(73) Assignee: Sinton Consulting, Inc., Boulder, CO (US)

( * ) Notice: Subject to any disclaimer, the term of this patent is extended or adjusted under 35 U.S.C. 154(b) by 199 days.

(21) Appl. No.: 14/551,627

(22) Filed: Nov. 24, 2014

(65) Prior Publication Data

US 2015/0303868 A1 Oct. 22, 2015

Related U.S. Application Data

(60) Provisional application No. 61/982,222, filed on Apr. 21, 2014.

(51) Int. Cl.
*G01R 31/26* (2014.01)
*H02S 50/10* (2014.01)

(52) U.S. Cl.
CPC .................................... *H02S 50/10* (2014.12)

(58) Field of Classification Search
CPC ....... F21S 8/006; G01R 31/26; G01R 31/40; G01R 31/42; H01L 22/00; H01L 31/04; H01L 51/0031
See application file for complete search history.

(56) References Cited

U.S. PATENT DOCUMENTS

| 7,309,850 | B2 * | 12/2007 | Sinton | H02S 50/10 250/203.4 |
|---|---|---|---|---|
| 7,696,461 | B2 | 4/2010 | Sinton et al. | |
| 2005/0073289 | A1 * | 4/2005 | Takada | H01M 8/04589 323/282 |

* cited by examiner

*Primary Examiner* — Tung X Nguyen
(74) *Attorney, Agent, or Firm* — Beyer Law Group LLP

(57) ABSTRACT

A solar cell or module is illuminated at one sun intensity and is placed into short circuit. Current and voltage measurements are taken. Control circuitry commands a second, higher terminal voltage of the solar cell such as a maximum power voltage. A higher intensity light pulse (for example, three suns) is applied to the solar cell or module when the second voltage is commanded. Voltage ramps more quickly because of the high-intensity light pulse. When the second terminal voltage is reached the light pulse terminates and measurements are taken while the solar cell remains illuminated at one sun intensity. The solar cell is placed into open circuit conditions and in conjunction with that action another high-intensity light pulse is applied. When the steady-state open circuit voltage for one sun is reached the pulse terminates. Characteristics are measured including current and voltage at the terminals of the solar cell or module.

22 Claims, 4 Drawing Sheets

Time Response of Solar Cell from Short-Circuit to Open-Circuit Conditions

Time Response of Solar Cell from Short-Circuit to
Open-Circuit Conditions

Time Response of Solar Cell from .6V to Open-Circuit Conditions

Time Response of Solar Cell with Light Pulse

RAPID MEASUREMENT OF CURRENT-VOLTAGE CHARACTERISTICS OF SOLAR CELLS AND MODULES

CROSS REFERENCE TO RELATED APPLICATIONS

This application claims priority under 35 U.S.C. §119(e) of U.S. Provisional Patent Application No. 61/982,222, filed Apr. 21, 2014, entitled "RAPID MEASUREMENT OF CURRENT-VOLTAGE CHARACTERISTICS OF SOLAR CELLS AND MODULES," which is hereby incorporated by reference.

STATEMENT REGARDING FEDERALLY SPONSORED RESEARCH OR DEVELOPMENT

This invention was made with government support under DE-SC0010156 awarded by SBIR. The government has certain rights in the invention.

FIELD OF THE INVENTION

The present invention relates generally to the testing of solar cells and modules. More specifically, the present invention relates to the rapid measurement of current and voltage characteristics.

BACKGROUND OF THE INVENTION

In production lines of solar cells and solar modules, it is desired to measure characteristics of these solar cells and modules at a high rate of speed in order to have a high production throughput. Generally, the solar cells (or modules) are measured under an illumination at an intensity of one sun. One sun is approximately 100 mW/cm$^2$ of light intensity, having a light spectrum similar to sunlight.

One issue that limits the speed at which accurate tests can be made is the time response of the solar cell. For example, if you measure short circuit current (i.e., when the cell voltage is 0V) and then switch to open-circuit voltage with a typical measurement apparatus, it takes time for the solar cell to increase its voltage (when a light pulse is applied) up to the steady-state voltage after the open-circuit voltage condition is commanded by the control circuitry. Because measurements of characteristics of a solar cell are typically taken at different voltages (e.g., short circuit, maximum power conditions, open-circuit, etc.), and because it takes time for the solar cell to ramp up to these voltages, current measurement techniques can be relatively time-consuming and slow down a production line. Measurements may be performed as disclosed in U.S. Pat. Nos. 7,309,850 and 7,696,461 which are both incorporated by reference.

Accordingly, new techniques are desirable that would speed up the measurement of various characteristics of solar cells and solar modules.

SUMMARY OF THE INVENTION

To achieve the foregoing, and in accordance with the purpose of the present invention, a measurement technique is disclosed that permits accurate reporting of the steady-state voltage and current characteristics of a solar cell in less time—enabling faster measurements. For production equipment, this permits faster measurement throughput and lower power consumption by the equipment used to produce light pulses. More voltage steps can be accomplished in the same length of time. The voltage ramps upward more quickly by supplementing the incident light (e.g., a slowly-varying or a uniform light pulse) with a short high-intensity pulse or pulses of light.

In one embodiment, the solar cell or module is placed into a short-circuit condition and is illuminated at one sun intensity. Current and voltage measurements may be taken at that time. Next, associated control circuitry places the solar cell or module into an open circuit condition, and in conjunction with that action a higher intensity light pulse is also applied to the solar cell or module, for example, a light pulse at three suns intensity. When the solar cell or module reaches its steady-state voltage at one sun intensity the high-intensity light pulse terminates and the solar cell or module remains illuminated at one sun intensity. Characteristics may then be measured at that time including current and voltage at the terminals of the solar cell or module.

In a second embodiment, the solar cell or module is illuminated at one sun intensity and associated control circuitry provides a first terminal voltage at the terminals of the solar cell or module. For example, this voltage may be 0 V or a higher voltage. Current and voltage measurements may be taken at that time. Next, the associated control circuitry provides a second, higher terminal voltage to the terminals of the solar cell or module. For example, the second voltage may be a maximum power condition voltage. In conjunction with that second voltage, a higher intensity light pulse is also applied to the solar cell or module, for example, a light pulse at three suns intensity. When the solar cell or module reaches this second voltage the high-intensity light pulse terminates and the solar cell or module remains illuminated at one sun intensity. Characteristics may then be measured at that time including current and voltage at the terminals of the solar cell or module.

In a third embodiment, the terminal voltage of the solar cell or module is ramped more quickly from a first terminal voltage (such as a maximum power condition voltage) up to the steady-state open circuit voltage for the solar cell or module at a particular intensity (such as one sun intensity). Again, a higher intensity light pulse initiates in conjunction when the solar cell or module is placed into an open-circuit condition and terminates before measurements may be taken at the original intensity.

In other embodiments, the terminal voltage of the solar cell or module may be ramped from 0 V through any number of voltage points up to the steady-state open circuit voltage of the solar cell or module at a particular intensity, and current-voltage pair measurements may be taken at each of these voltage points. The innovative concept of applying a higher intensity light pulse while the voltage is being ramped from one voltage up to another may be used on each of the voltage ramps.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

It is realized that a solar cell needs to fill up with electron-hole pairs in order to increase its voltage. The invention is applicable to both solar cells and solar modules although the below description often refers simply to a solar cell. The electron-hole pair density in the solar cell (Δn) is related to the voltage (V) as shown below in Equation 1.

$$\left[\frac{(N_D + \Delta n)(\Delta n)}{n_i^2}\right] = e^{qV/kT} \qquad \text{Equation 1}$$

In this equation, $N_D$ is the silicon wafer n-type wafer doping, Δn is the electron-hole pair density, $n_i$ is the intrinsic carrier density in silicon, V is the open-circuit voltage of the solar cell and kT/q is the thermal voltage at a temperature T in Kelvin. For p-type wafers, the $N_D$ in the formula would be replaced by $N_A$.

At one-sun intensity, photons arrive at a rate that creates approximately $3 \times 10^{17}$ electron-hole pairs in the solar cell per cm² per second ($3 \times 10^{17}/(\text{cm}^2\text{-s})$). For a solar cell with a steady-state open-circuit voltage of 720 mV, and a thickness (W) of 0.02 cm, this would require a minimum of 0.7 ms to reach this steady-state voltage when illuminated at one-sun intensity. Steady state is defined as when the electron-hole pairs recombine at the same rate that they are photogenerated.

Time Response of a Solar Cell

Figure 1:
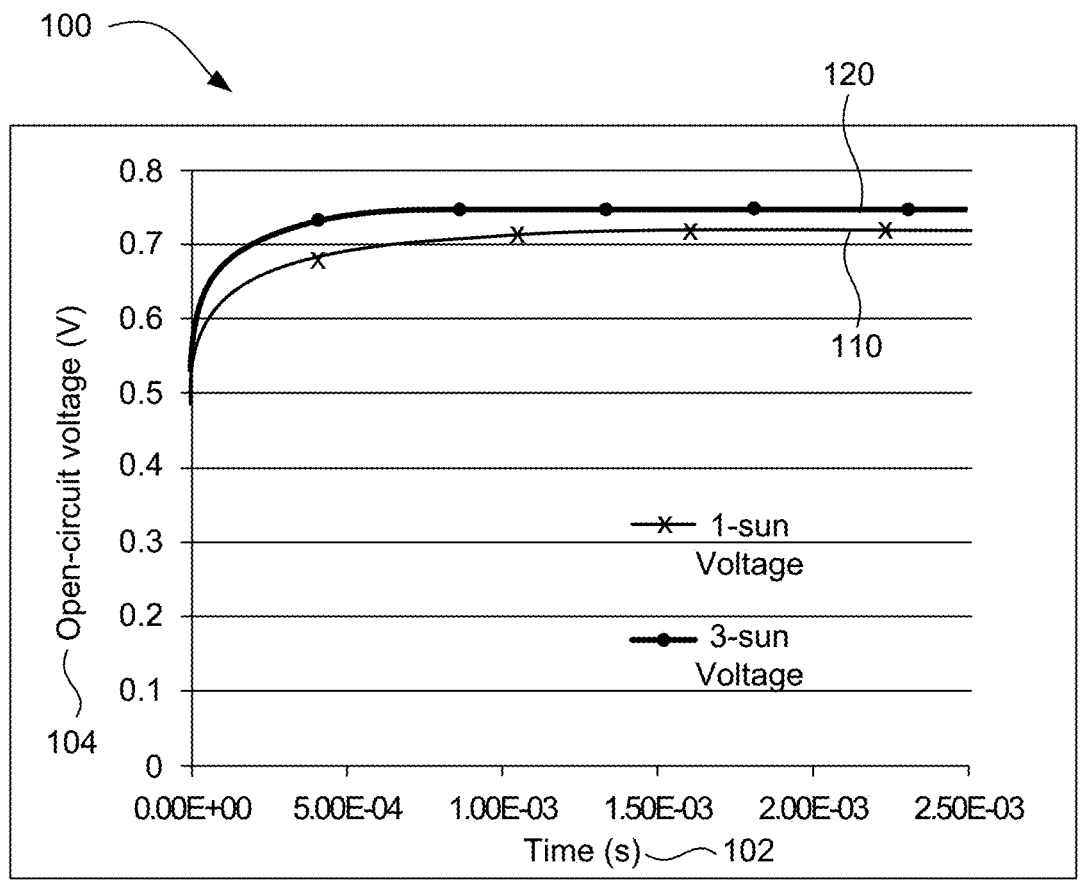
FIG. 1 shows the calculated time response of a high-efficiency solar cell when the cell is switched from short-circuit conditions to open-circuit conditions.

FIG. 1 shows the calculated time response of a high-efficiency solar cell when the cell is switched from short-circuit conditions to open-circuit conditions. Open circuit voltage 104 is plotted against time 102. Curve 110 shows the rise time to steady-state voltage at one sun intensity, while curve 120 shows the rise time under three suns intensity. FIG. 1 uses Equation 2 in order to calculate the time required to reach within about 0.5 mV of the steady-state open-circuit voltage using either an intensity of one or three suns. This calculation accounts for the filling rate due to photons in the illumination, balanced by the recombination rate of electron-hole pairs as they approach the steady state.

$$\Delta n = \int_0^t G - R \qquad \text{Equation 2}$$

Where generation (G) is $J_{sc} \times$(light intensity) in suns, and where $$\text{Recombination } (R) = \frac{\Delta n q W}{\tau} + \frac{J_{oe} \Delta n^2}{n_i^2} + qW\Delta n^3 C_A$$

Further calculation parameters for the curve in FIG. 1 are: $N_D = 1 \times 10^{15}$ cm⁻³; bulk lifetime (τ)=0.005 s; cell thickness=0.02 cm; emitter saturation current density ($J_{oe}$)=1.9×10⁻¹⁴ A/cm²; Auger coefficient (CA)=1.66×10⁻³⁰ cm⁶/s; and short-circuit current density at one sun ($J_{sc}$)=0.04 A/cm²

These calculations and trace 110 of FIG. 1 show that the fastest possible measurement of the open-circuit steady-state voltage of a solar cell at one sun intensity (720 mV in this case) is 2.1 ms after measuring the short-circuit condition. In contrast, trace 120 of FIG. 1 shows the open-circuit voltage vs. time for a solar cell at three suns of illumination intensity in which the cell reaches 720 mV in 0.3 ms. Ramping the voltage from short circuit to open-circuit at three suns can reduce the time to reach the one-sun open-circuit steady-state voltage of a solar cell from 2.1 ms to 0.3 ms. Under very high light intensities, the Δn increase required to step from one voltage to another will simply be proportional to the photon intensity multiplied by the time. The higher the intensity, the shorter the pulse required to ramp the solar cell from one voltage to a higher one.

Thus, a faster measurement sequence can be accomplished by ramping the solar cell voltage under three suns intensity to the steady-state voltage of one sun, then switching the light source to one sun and measuring the current that the solar cell (or solar module) produces at this voltage under one-sun illumination.

Comparison of Measurement Times

To better illustrate a faster total measurement time, assume that it takes 0.2 ms to acquire the current and voltage characteristics at one sun with a typical data acquisition system. The measurement at a particular voltage includes commanding a voltage from the circuitry, waiting for the voltage to rise to that value, and then taking data for 0.2 ms in order to report the current at that precise voltage. Then, the next voltage would be commanded, a measurement taken, etc.

Consider the case where the characterization of the solar cell includes determining the current at three voltages: short circuit conditions (0V); maximum power conditions (0.6V); and open-circuit conditions (0.72V). The total measurement time under one sun of constant light would take 2.13 ms of ramping time in addition to 3×0.2 ms of data acquisition time, for a total of 2.73 ms. If instead, the voltage ramping were done under three suns of intensity, the total time for determining these three data points is reduced to 0.92 ms. The timing sequence for this example is shown in Table 1.

TABLE 1

| Step | Time at constant one sun | Time if voltage ramps are done at three suns | Time saved by ramping voltage at three suns |
| --- | --- | --- | --- |
| Measure Isc, voltage at 0 V | 0.200 ms | 0.200 ms | |
| Ramp voltage to 0.6 V | 0.051 ms | 0.017 ms | 0.034 ms |
| Measure I, V at 0.6 V | 0.200 ms | 0.200 ms | |
| Ramp voltage to 0.72 V | 2.080 ms | 0.306 ms | 1.774 ms |
| Measure I, V at 0.72 V | 0.200 ms | 0.200 ms | |
| Total measurement time | 2.73 ms | 0.92 ms | |

Comparison of Measurement Times

Typically, the circuitry is used to command 0 V and 0.6 V (for example); in order to obtain the steady-state voltage, the circuitry is basically inactive and the incident light upon the solar cell from the illumination is used to raise the voltage. Alternatively, for the ramp from maximum power to open-circuit voltage the circuitry may be used. For example, to obtain the equivalent of applying two suns of intensity (in addition to the one-sun already present) in order to ramp the voltage, one may reverse the typical 9 A of current (that the cell produces at the maximum power point) and apply two times this amount in the opposite direction while still illuminating at one sun. This would produce a square pulse of 18 A of current, with an abrupt turn on and turn off. This abrupt change of current, +27 A in a few microseconds, would cause the circuit to ring due to the high capacitance of the solar cell, the high inductance of the wiring, and the high dI/dt. Thus, this approach would be impractical as it causes severe ringing in the circuit. On the other hand, the same effect is accomplished as explained above (i.e., ramping under three suns intensity) with a pulse of inductance-free photons and none of the detrimental effects of ringing.

Note that the time delay from 0 V up to 0.6 V and the time delay from 0.6 V up to the steady-state voltage of 0.72 V is caused by the solar cell filling up with electron hole pairs due to the illumination from the flash. The carrier density, however, (see Equation 1) is exponential in V. So, the capacitance is exponential in voltage as well. It takes very little relative time to go from 0V up to 0.6V, as compared to go from 0.6V up to 0.72V. The charge doubles every 18 mV-36 mV, depending on the voltage. This is why it is quick to go from 0V up to 0.6V. One can see this effect in FIG. 1; the first 0.6V is very quick.

The advantage of ramping the voltage under brief intervals of high-intensity light is that the steady-state results for a cell or module can be measured (using the methods of U.S. Pat. Nos. 7,309,850 and 7,696,461) in less time. In this example, the total measurement time is reduced from 2.73 ms to 0.92 ms. This reduction by a factor of three enables faster measurements. Also, short pulses of light at higher intensity are less expensive to produce than long ones.

The high intensity light pulses may be provided in one of several ways: 1) if the primary source of light is a constant or a slowly-varying light source (e.g., as described in the U.S. Patents cited above) then the high-intensity pulses of light are provided by augmenting the primary light source with a laser, light emitting diode (LED), or xenon flash that is incident on the solar cell only for the short voltage-ramp periods; or 2) a single light source (laser, LED, xenon flash, etc.) may be modulated to have the appropriate time-intensity profile. The high-intensity light pulses can be of any intensity. The higher the intensity, the shorter the time required to ramp the voltage from one voltage to a higher one. Preferably, the voltage and current measurements are done at one sun intensity if the intent is to characterize the cell at one sun (which is typical). In general, other intensities (higher than one sun) may be used in which to measure these characteristics, but this would require using a much higher intensity (higher than three suns) to rapidly ramp the voltage.

Example Implementation

Figure 2:
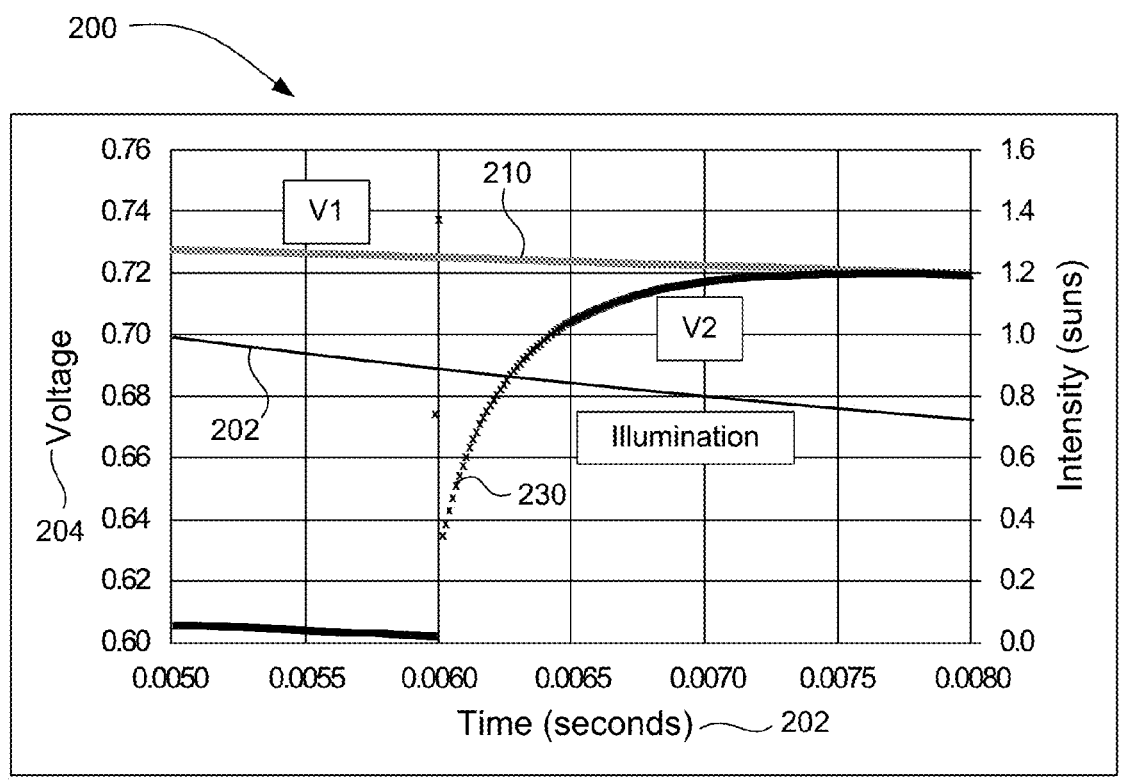
FIG. 2 shows the voltage of an open-circuit solar cell for a slowly varying light pulse under two cases.

FIG. 2 shows the voltage of an open-circuit solar cell for a slowly varying light pulse under two cases. If the solar cell is held at open-circuit conditions while the light from a Xenon flash (trace 220) slowly varies, the quasi steady-state voltage for this light intensity is as shown in the top trace V1, 210. If instead, the cell is held at 0.6V up to 0.006 seconds into the trace, and then put into an open-circuit condition, the voltage (trace V2, 230) takes 2 ms to rise to the correct steady-state voltage for this light intensity. After 2 ms trace 230 and trace 210 agree, and trace 230 would then report valid data for this light intensity that is the same as the steady-state condition. Thus, in this example, the time response to ramp the solar cell from 0.6 V to its steady-state open-circuit voltage is 2 ms at intensity 220. Intensity 220 is the intensity at which it is desired to measure the voltage and current characteristics.

Figure 3:
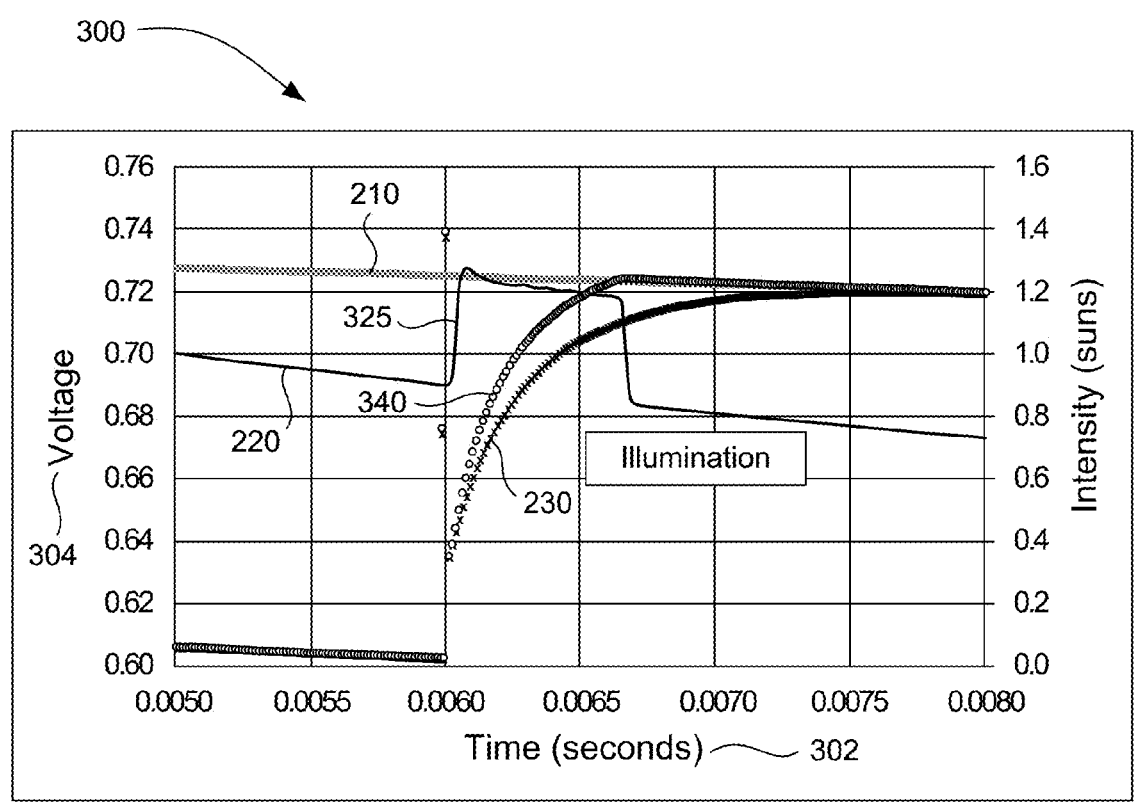
FIG. 3 shows the innovation in which the slowly varying light pulse of FIG. 2 is supplemented by a 600 μs square wave light pulse from a light-emitting diode (LED).

FIG. 3 shows the innovation in which the slowly varying light pulse of FIG. 2 is supplemented by a 600 us square wave light pulse 325 from a light-emitting diode (LED). This pulse is synchronized with the solar cell control circuitry to occur when a higher voltage is commanded by the circuit. When the light-time profile is augmented with a short pulse synchronized to commence at the point where the solar cell is put into an open-circuit condition (when the solar cell is at approximately 0.6 V), then the voltage (trace 340) rises at a faster rate during the extra light pulse, reaching the steady-state voltage trace 210 in 600 us rather than the 2 ms shown in FIG. 2 for the case without the extra light pulse. This results in being able to record a valid steady-state voltage at this light intensity 220 in 1.4 ms less time. Once the voltage ramp of trace 340 to the steady-state voltage is complete, the LED turns off and the voltage-current point can be recorded at intensity 220 and used to calculate a solar cell efficiency at this voltage. Thus, the measurement is taken after light pulse 325 when illumination has returned to intensity 220.

This sequence may be repeated many times to acquire many current-voltage pairs at voltages ranging from the short-circuit voltage condition up to the open-circuit voltage condition.

Computer System Embodiment

Figure 4A:
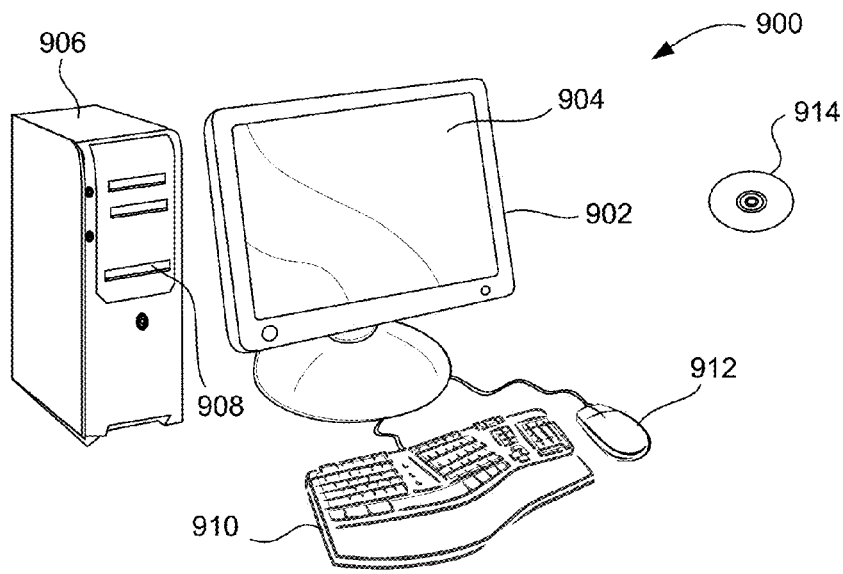
FIGS. 4A and 4B illustrate a computer system suitable for implementing embodiments of the present invention.
Figure 4B:
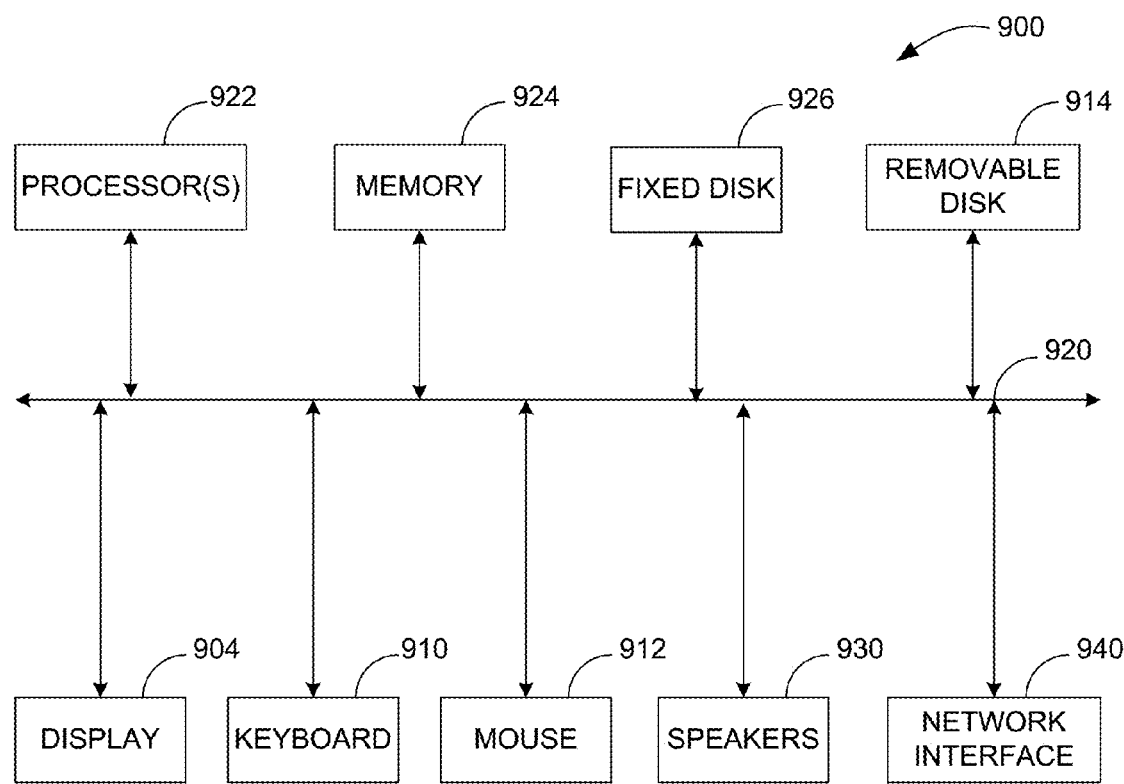

FIGS. 4A and 4B illustrate a computer system 900 suitable for implementing embodiments of the present invention. FIG. 4A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of measuring characteristics of a solar cell or module, said method comprising:
   placing said solar cell or module into a short-circuit condition;
   illuminating said solar cell or module at a first intensity using a light source;
   placing said solar cell or module into an open-circuit condition;
   supplementing said first intensity with a light pulse of a second intensity that is higher than said first intensity while said solar cell or module is in said open circuit condition; and
   measuring a characteristic of said solar cell or module at said first intensity when a terminal voltage of said solar cell or module reaches a steady-state open-circuit voltage for said solar cell module at said first intensity.

2. The method as recited in claim 1 further comprising:
   terminating said light pulse when said voltage of said solar cell or module reaches said steady-state open-circuit voltage.

3. The method as recited in claim 1 further comprising:
   measuring said characteristic of said solar cell or module after said light pulse ends.

4. The method as recited in claim 1 wherein said first intensity is a constant intensity.

5. The method as recited in claim 1 wherein said first intensity is slowly varying.

6. The method as recited in claim 1 wherein said characteristic is a terminal current of said solar cell or module.

7. The method as recited in claim 1 wherein measuring a characteristic of said solar cell or module includes measuring a terminal current and said terminal voltage of said solar cell module.

8. A method of measuring characteristics of a solar cell or module, said method comprising:
   commanding control circuitry to provide a first terminal voltage to said solar cell or module;
   illuminating said solar cell or module at a first intensity using a light source;
   commanding said control circuitry to provide a second terminal voltage to said solar cell or module that is greater than said first terminal voltage;
   in conjunction with said second step of commanding, supplementing said first intensity with a light pulse of a second intensity that is higher than said first intensity; and
   measuring a characteristic of said solar cell or module at said first intensity when said terminal voltage of said solar cell or module reaches said second terminal voltage commanded by said control circuitry.

9. The method as recited in claim 8 further comprising:
   terminating said light pulse when said terminal voltage of said solar cell or module reaches said second terminal voltage.

10. The method as recited in claim 8 further comprising:
    synchronizing said light pulse to commence when said control circuitry commands said second terminal voltage.

11. The method as recited in claim 8 further comprising:
    measuring said characteristic of said solar cell or module after said light pulse ends.

12. The method as recited in claim 8 wherein said characteristic is a current of said solar cell or module.

13. The method as recited in claim 8 wherein measuring a characteristic of said solar cell or module includes measuring a terminal current and said terminal voltage of said solar cell module.

14. The method as recited in claim 8 wherein said first terminal voltage is a short-circuit condition of said solar cell or module.

15. The method as recited in claim 8 wherein said second terminal voltage is a maximum power condition voltage of said solar cell or module.

16. A method of measuring characteristics of a solar cell or module, said method comprising:
    commanding control circuitry to provide a first terminal voltage to said solar cell or module;
    illuminating said solar cell or module at a first intensity using a light source;
    placing said solar cell or module into an open-circuit condition;
    in conjunction with said placing, supplementing said first intensity with a light pulse of a second intensity that is higher than said first intensity; and
    measuring a characteristic of said solar cell or module at said first intensity when a terminal voltage of said solar cell or module reaches a steady-state open-circuit voltage for said solar cell module at said first intensity.

17. The method as recited in claim 16 further comprising:
    terminating said light pulse when said terminal voltage of said solar cell or module reaches said steady-state open circuit terminal voltage.

18. The method as recited in claim 16 further comprising: synchronizing said light pulse to commence when said solar cell or module is placed into said open-circuit condition.

19. The method as recited in claim 16 further comprising: measuring said characteristic of said solar cell or module after said light pulse ends.

20. The method as recited in claim 16 wherein said characteristic is a terminal current of said solar cell or module.

21. The method as recited in claim 16 wherein measuring a characteristic of said solar cell or module includes measuring a terminal current and said terminal voltage of said solar cell module.

22. The method as recited in claim 1 wherein said first terminal voltage is a maximum power condition voltage of said solar cell or module.

* * * * *